Figure 1A:
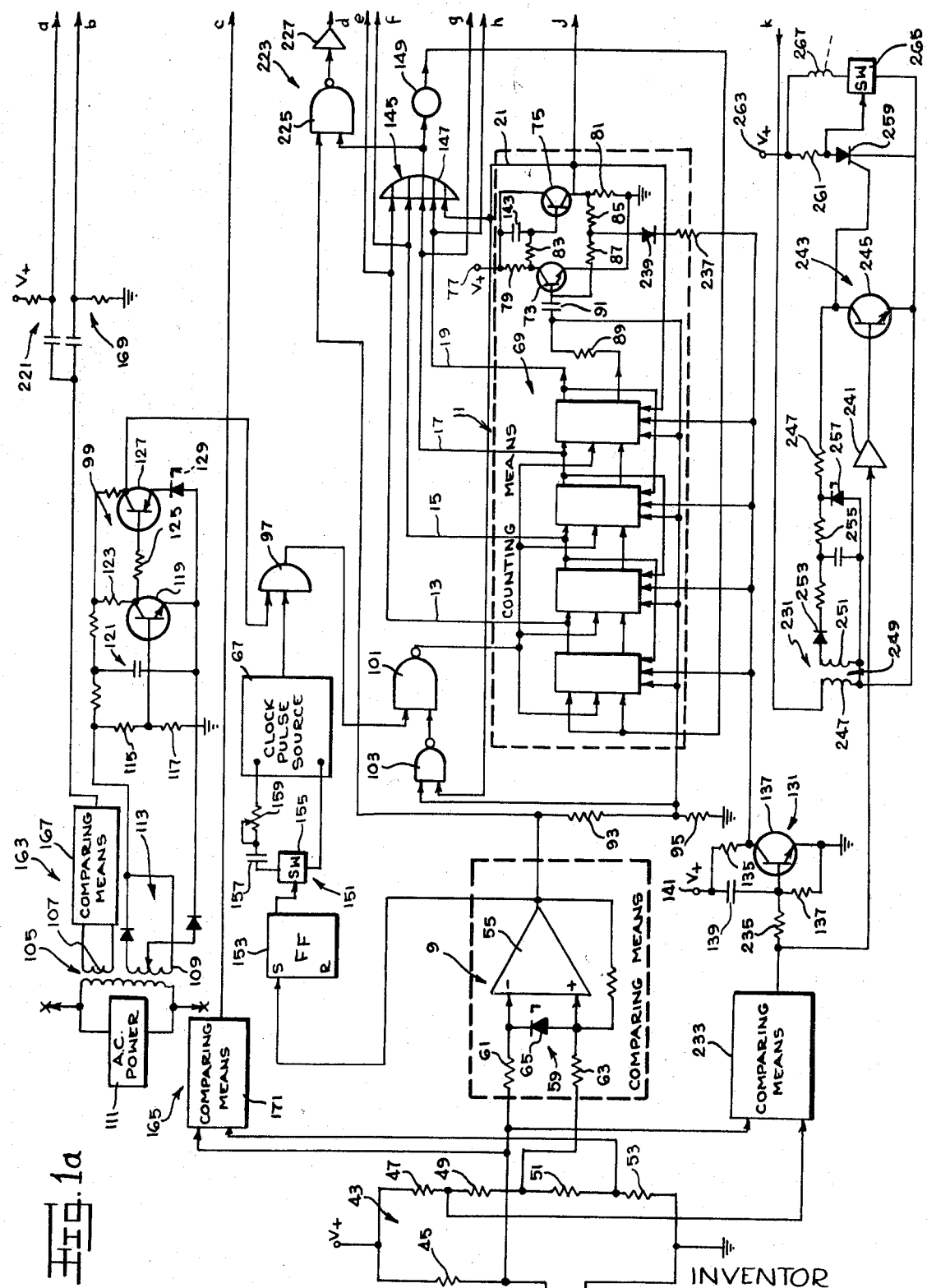

United States Patent

[11] 3,548,155

| [72] | Inventor | Karavattuveetil George Rabindran<br>Evanston, Ill. |
|---|---|---|
| [21] | Appl. No. | 863,513 |
| [22] | Filed | Oct. 3, 1969 |
| [45] | Patented | Dec. 15, 1970 |
| [73] | Assignee | Vapor Corporation<br>Chicago, Ill.<br>a corporation of Delaware |

[54] CONTROLLER FOR A TEMPERATURE CONTROL SYSTEM
4 Claims, 2 Drawing Figs.

[52] U.S. Cl. ................................................. 219/497,
219/499
[51] Int. Cl. ....................................................... H05b 1/02
[50] Field of Search .......................................... 219/497;
499, 501, 505, 494

[56] References Cited
UNITED STATES PATENTS

| 3,231,719 | 6/1966 | De Viney ...................... | 219/501 |
| 3,290,486 | 12/1966 | Mordwinkin ................. | 219/499 |
| 3,300,622 | 1/1967 | Swain ............................ | 219/497 |
| 3,431,399 | 3/1969 | Venning ....................... | 219/497 |
| 3,445,626 | 5/1969 | Micheals ...................... | 219/501 |
| 3,452,214 | 6/1969 | Martin .......................... | 219/501 |

*Primary Examiner*—Bernard A. Gilheany
*Assistant Examiner*—F. E. Bell
*Attorney*—Norman Aon Witt ABSTRACT: The temperature controller comprises a means for sensing a temperature of a load which is to be controlled in temperature. The temperature sensing means provides a signal representing the temperature of the load and this signal is supplied to a comparing means which provides an output signal of a first level when the temperature is above a set point and a signal of a second level when the temperature is below the set point. The output signal is applied to a bidirectional counting means which counts clock pulses applied thereto, the direction of counting therein being controlled by the level of the output signal. The counting means includes a plurality of output leads, each representing a bit storage position in the counting means. Each of the output leads is rendered conductive in response to a bit on the associated output lead. The output leads are connected to respective switching means, each of which is rendered conductive in response to a bit on the associated output lead. The switching means connect respective power leads, which provide electrical power in steps, to the load, whereby one power lead is connected to the load depending upon which of the switching means is energized by the output lead.

INVENTOR
KARAVATTUVEETIL GEORGE RABINDRAN

ATTYS.

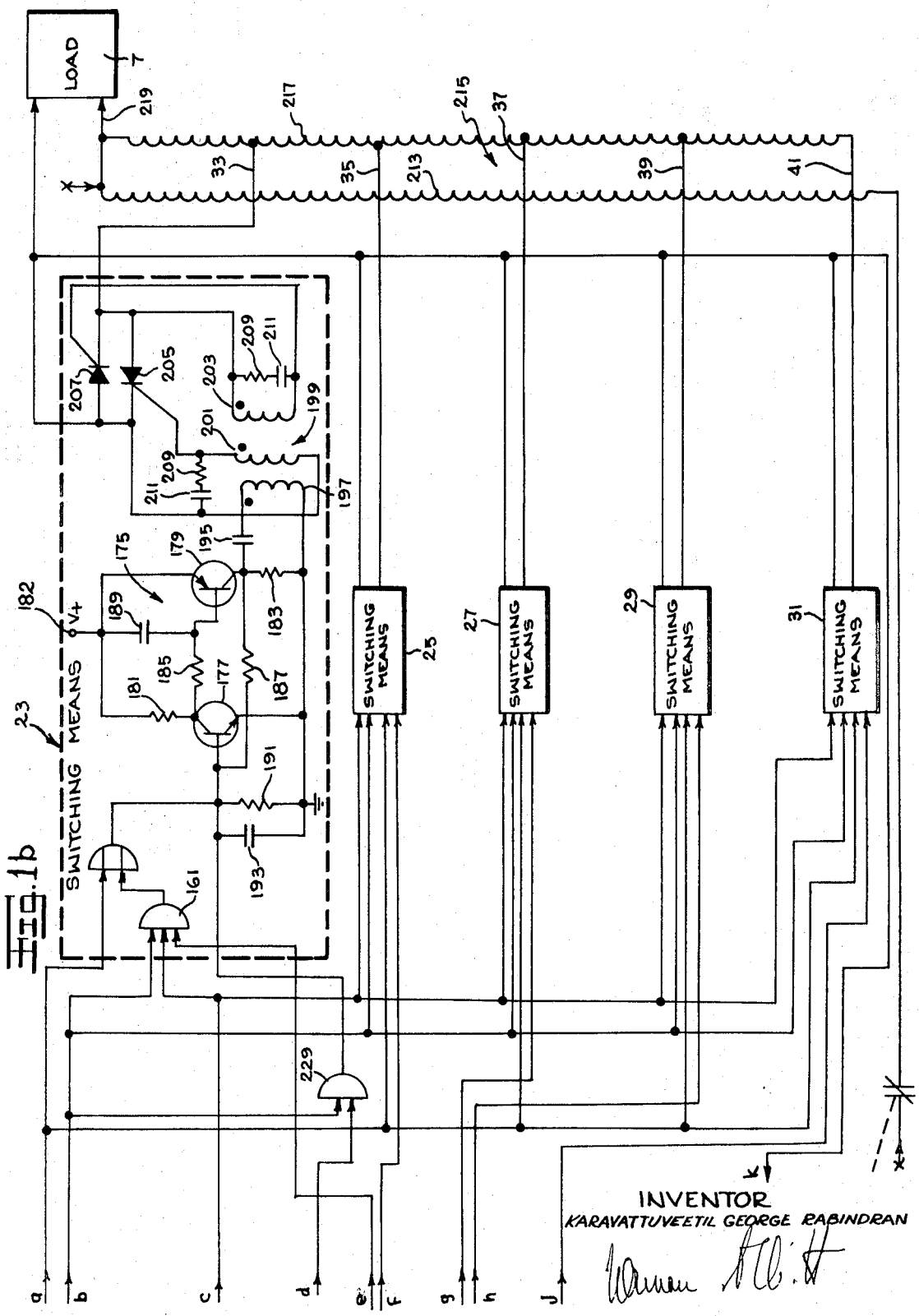

CONTROLLER FOR A TEMPERATURE CONTROL SYSTEM

The present invention relates to a controller for a temperature control system and more particularly to an integrating type, digital controller for such a system.

It has been common practice in previous electrical temperature control systems to employ controllers of the proportional type. Such proportional controllers depend upon an error in the control point from zero power to full electrical power. The controller will always have temperature error between zero and full power. Only at 50 percent power will the controller be at the exact nominal set point. Also, such controllers, when a digital output is used, normally require one amplifier for each power level. This results in a complexity of design and reduces the reliability of the controller.

An object of the present invention is to provide an integrating type, digital controller for a temperature control system.

Another object is the provision of an integrating type, digital controller set for a temperature control system which is relatively simple, accurate in control, and reliable.

Other objects and advantages of the present invention will become apparent by reference to the following description and accompanying drawings in which:

FIGS. 1a and 1b are a combination block and circuit diagram of a temperature controller in accordance with the present invention.

Generally, in accordance with the present invention, the temperature controller comprises a means 5 for sensing the temperature of a load 7, which is to be controlled in temperature. The temperature sensing means 5 provides a signal representing the temperature of the load 7, and this signal is supplied to a comparing means 9 which provides an output signal of a first level when the temperature is above a set point and a signal of a second level when the temperature is below the set point. The output signal is applied to a bidirectional counting means 11 which counts clock pulses applied thereto, the direction of counting therein being controlled by the level of the output signal. The counting means 11 includes a plurality of output leads 13, 15, 17, 19 and 21, each representing a bit storage position in the counting means 11. The output leads are connected to respective switching means 23, 25, 27, 29 and 31, each of which is rendered conductive in response to a bit on the associated output lead. The switching means 23, 25, 27 and 29 connect respective power leads 33, 35, 37, 39 and 41 which provide electrical power in steps, to the load 7, whereby one power lead is connected to the load depending upon which of the switching means is energized by the output leads.

More particularly, in the illustrated embodiment, the temperature sensing means 5 of the temperature controller is a temperature sensitive resistance disposed in one leg of a DC resistance bridge circuit 43. A fixed resistor 45 is connected in series with the temperature sensitive resistance 5 to form one side of the bridge and this series circuit is connected to a regulated direct current supply (not shown). The other side of the bridge 43 is formed by four series resistors 47, 49, 51 and 53.

A first output of the bridge circuit 43, which is taken between the junction of the two resistors 5 and 45 forming the first described side of the bridge 43 (hereinafter referred to as the reference junction) and the junction between the second and third resistors 49 and 51, is applied to the comparing means 9 which senses the direction of unbalance in the bridge 43. The comparing means 9 provides a low output (logical 0) when the temperature sensitive resistance 5 is above the set point and a high output (logical 1) when the temperature sensitive resistance 5 is below the set point. In the illustrated embodiment, the comparing means 9 includes a high-gain integrated operational amplifier 55, such as μA709 manufactured by Fairchild Semiconductor, having a resistor 57 connected as a positive feedback to provide snap action an an input protecting circuit 59 formed of a series resistor 61, 63 in each input and a parallel Zener diode 65.

The output of the comparing means 9 is applied to the input of the bidirectional counting means 11 which stores clock pulses received from a clock pulse source 67 and provides an output signal on one of a plurality of output leads 13, 15, 17, 19 and 21 which indicate each bit storage position in the counting means 11. The output signal is shifted from output lead to output lead in sequence, upon the receipt of a clock pulse, the direction of counting depending upon whether the input from the comparing means 9 is a low input or a high input. In the illustrated embodiment, the counting means 11 is a shift register circuit which provides both shift left and shift right capabilities. The register 69 is shifted to the left or to the right one storage position or bit (one step) every time a clock pulse is received. The shift will be to the right if the input from the comparing means 9 is high and to the left if the input from the comparing means 9 is low. The illustrated shift register 9 has five storage positions or bits, four bits being provided by a four-bit left/right shift register 69, such as the CCSL 9300 manufactured by Fairchild Semiconductor, and a fifth bit being provided by a flip-flop circuit 71. However, a bidirectional ring counter, or a forward-backward counter with an output decoder may also be used in certain applications.

The illustrated flip-flop circuit 71 is of the complementary bistable type. More particularly, the flip-flop circuit 71 includes an NPN transistor 73 and a PNP transistor 75, the emitter of the NPN transistor 73 being grounded and the emitter of the PNP transistor 75 being connected to a positive voltage terminal 77. The collector of the NPN transistor 73 is biased positively by a resistor 79 connected to the positive voltage terminal 77 and the collector of the PNP transistor 75 is grounded through a resistor 81. The collector of the NPN transistor 73 is connected through a series resistor 83 to the base of the PNP transistor 75. The collector of the PNP transistor 75 is connected through a pair of series resistors 85 and 87 to the base of the NPN transistor 73. The inverted output of the last stage of the four-bit left/right shift register 69 is connected through a series resistor 89 and capacitor 91 to the base of the NPN transistor 73. The output of the flip-flop 71 (i.e., the collector of the PNP transistor) is connected to the shift left terminal of the four-bit shift register 69 whereby, if the flip-flop 71 is in its logical 1 state, the fourth stage will be turned on by a left shift signal and the flip-flop 71 will be turned off by the fourth stage changing states.

The output of the comparing means 9 is connected to a voltage divider comprised of two series resistors 93 and 95 and the junction between the resistors is connected to the shift left/right control terminal of the shift register 69 and through a diode to the junction between the capacitor 91 and the resistor 89. Thus, the flip-flop 71 is caused to switch states to provide a logical 1 on its output by the fourth stage of the four-bit shift register 69 switching off in the presence of a high level or shift right signal.

Clock pulses are supplied by the clock pulse source 67 which may be a conventional free-running multivibrator (not shown) whose output is connected to a differentiating circuit (not shown). Preferably, the repetition rate of the clock pulses is adjusted to closely match the thermal response characteristic of the load 7 to provide close control of the temperature. The clock pulses are supplied to one input of an AND gate 97. The other input is a signal, provided by a zero crossing circuit 99 described hereinafter, which is zero for a short period near zero crossover of the AC input power. Thus, this AND gate 97 prevents clock pulses from being supplied during zero crossover thereby preventing a register shift during this time which may result in two of the switching means 23, 25, 27, 29 and 31 being turned on at the same time. The output of the AND gate 97 is connected to one input of a NANA gate 101, the other input of which is at a one level except when the flip-flop 71 is at a one level and a right shift is called for by the comparing means 9. In this connection, the junction between the resistors 93 and 95 in the comparing means 9 output is connected to one input of a second NAND gate 103 and the output of the flip-flop 71 is connected to the other input. The output of the second NAND gate 103 is connected to the other input of the first NAND gate 101. The output of the first NAND gate 101 is connected to the clock pulse terminal of the four-bit left/right shift register 69.

The illustrated zero crossing circuit 99 includes a transformer 105 having two secondary windings 107 and 109 and a primary winding which is connected to the AC power supply 111. One of the secondary windings 109 has its center tap connected to ground and its end taps connected to a full wave rectifier 113. The output of the full wave rectifier 113 is coupled across two series resistors 115 and 117, the junction of which is connected to the base of an NPN transistor 119. The output is also coupled through a filter 121 and a collector resistor 123 to the collector of the transistor 119. The emitter of the transistor 119 is grounded. Thus, the transistor 119 is turned off for a short period near the zero crossover of the AC power. The output of the transistor 119 is applied through a series resistor 125 to the base of a PNP transistor 127 which is biased by a Zener diode 129 in its emitter circuit so that only the pulses representing the short periods near the zero crossover are amplified and applied to the AND gate 97.

To insure that the four-bit shift register 69 is at logical 0 (i.e., the shift register 11 calls for zero power) on startup, a zero reset circuit 131 is provided for resetting each stage of the register 69 to zero when the power is initially turned on. In the illustrated embodiment, the collector of an NPN transistor 133 is connected to the master reset input of the four-bit register 69. The emitter of the transistor 133 is grounded and its collector is connected through a collector resistor 135 to a positive voltage terminal. The base of the transistor 133 is connected through a resistor 137 to ground and through a capacitor 139 to a positive voltage terminal 141. The capacitor 139 and resistor 137 thereby act as a differentiating circuit to bias the transistor 133 on when the power is initially applied to thereby effectively connect the master reset input of the four-bit register 69 to ground for a short period after turn on. The flip-flop 71 is caused to be in its zero state on startup by a capacitor 143 connected between the base of the PNP transistor 75 and the positive voltage terminal 77.

A circuit 145 is provided to place the shift register 11 in the shift right state if all of the bits of the four-bit shift register 69 and the flip-flop 71 carry logical zero. In the illustrated embodiment, this circuit 145 includes an OR gate 147 having each of the output leads 13, 15, 17 and 19 of the four-bit shift register 69 and the output lead 21 of the flip-flop 71 connected to its input and an inverter 149 connected to its output. The output of the inverter 149 is connected to the shift right input (i.e., the J and K inputs) of the four-bit shift register 69.

During startup, the repetition rate of the clock pulses is slowed down so that the load 7 can be slowly warmed up. To accomplish this, a circuit 151 is provided which reduces the frequency of the multivibrator in the clock pulse source 67 during startup until the temperature of the load 7 reaches the set point. This circuit 151 includes a bistable flip-flop 153 which is connected so as to provide an output signal, when power is initially applied to the controller, to a normally open switch 155, which may be a transistor switch, connected in series with a capacitor 157 and a variable resistor 159. This series circuit is connected in parallel with the capacitor (not shown) which determines the frequency of operation of the multivibrator in the clock source 67. The output of the comparing means 9 is connected to the set input of the flip-flop 153 which is responsive to the first high-to-low transition of the output of the comparing means 9. Thus, the clock pulse source 67 continues in the startup mode of operation until the temperature of the load 7 exceeds the set point, at which time the output of the comparing means 9 causes the flip-flop 153 to switch states, thereby opening the switch 155.

The output leads 13, 15, 17, 19 and 21 of the bits of the four-bit shift register 69 and the flip-flop 71 are connected to the respective switching means 23, 25, 27, 29 and 31, each of which is arranged so as to be switched on when a logical 1 is present on its associated bit and the AC power passes through zero and to be turned off at the next zero crossing. The switching at zero power level minimizes radio frequency interference. All of the switching means 23, 25, 27, 29 and 31 are substantially the same except for the switching means 23 for the first power level which has an extra circuit employed during startup. For purposes of this description, only the first level switching means 23 is shown in detail in the drawings and is described hereafter.

The first level bit from the shift register is connected to one input of a three-input AND gate 161. A second input of the AND gate 161 is connected to receive positive pulses from a zero sync circuit 163, which pulse indicates the zero crossings of the AC power. The third input of the AND gate 161 is provided by a sensor short circuit sensing means 165, described hereinafter, and is normally at logical 1 except when the sensing resistance 5 is shorted. Thus, an output is only provided at the output of the AND gate 161 when the shift register 11 calls for a first level and at zero crossing of the AC power.

The illustrated zero sync circuit 163 includes a comparing means 167, which may be the same as the previous described comparing means 9, having its inputs connected across the secondary winding 107 of the power supply transformer 105. The output of the comparing means 167 is connected through a differentiating circuit 169, which is referenced to ground, to the one input AND gate 161.

The illustrated sensor short circuit sensing means 165 includes a comparing means 171, which may be the same as that previously described. The input of the comparing means 171 is connected between the reference junction of the bridge circuit 43 and the junction between the third and fourth resistors 51 and 53. The output is connected to the input of the AND gate 161.

The output of the AND gate 161 is applied through an OR gate 173 to a flip-flop 175 which has a complementary bistable configuration. In this connection, the flip-flop 175 includes an NPN transistor 177 having its emitter grounded and a PNP transistor 179 having its emitter connected to a positive voltage terminal 181. The NPN transistor 177 has its collector connected through a collector resistor 181 to the positive terminal 181 and the PNP transistor 179 has its collector connected through a collector resistor 183 to ground. A pair of resistors 185 and 187 cross couple the bases and collectors of the transistors 177 and 179. A capacitor 189 is connected between the base of the PNP transistor 179 and the positive voltage terminal 181 to insure that the output of the flip-flop 175 is zero at startup. The triggering pulse from the OR gate 173 is applied to the base of the NPN transistor 177 and the base is connected to ground through a resistor 191. A filter capacitor 193 is connected in parallel with the resistor.

The output of the flip-flop 175 is taken across the collector resistor 183 of the PNP transistor 179 and is connected through a capacitor 195 to a primary winding 197 of a firing transformer 199 which has two secondary windings 201 and 203. One of the secondary windings 201 is connected between the cathode and gate of a first silicon controlled rectifier 205. The other secondary winding 203 is connected between the cathode and gate of s second silicon controlled rectifier 207 which is connected in back to back relationship with the first silicon controlled rectifier 205. A resistor 209 and capacitor 211 are connected in series across each secondary winding 201, 203 of the firing transformer 199 to keep the silicon controlled rectifiers 205 and 207 from firing on stray signals. The anode of the first silicon controlled rectifier 205 and the cathode of the second silicon controlled rectifier 207 are connected to the first power terminal or tap 33 on a secondary winding 213 of a power transformer 215, the primary winding 217 of which is connected to the A.C. power supply 111. The cathode of the first silicon AC rectifier 205 and the anode of the second silicon controlled rectifier 207 are connected to one side of the load 7. The zero power tap 219 of the secondary winding 213 of the power transformer 215 is connected to the other side of the load 7.

The flip-flop 175 in the firing circuit 23 is switched off or reset by a negative pulse which is supplied by the zero sync circuit 163 and correspond in timing to the next zero crossover of the AC power. This negative pulse is provided by connecting the output of the comparing means 167 through a differentiating circuit 221, referenced to a positive potential, and the OR gate 173 to the base of the NPN transistor 177 of the flip-flop 175.

During startup, it is desirable to immediately apply power to the load 7 without waiting for a clock pulse from the clock pulse source 67. In the illustrated embodiment, the circuit 223 for providing this feature includes a NAND gate 225, the inputs of which are supplied by the output of the first comparing means 9 and the output of the OR gate 147. The output of the NAND gate 223 is applied through an amplifier 227 to one input of an AND gate 229, the other input being supplied by the positive pulse output of the zero sync circuit 163. The output of the AND gate 229 is connected to the trigger input of the flip-flop 175 in the first level switching means 23. Thus, the first level switching means 23 is rendered conductive at the zero crossover of the AC power if the temperature sensing resistor 5 is below the set point and no bit is energized in the shift register 11. These conditions would prevail on startup.

An overtemperature circuit 231 is provided to reset the shift register 11 to zero if an overtemperature is sensed and, if power is applied to the load while this overtemperature condition exists, to disconnect the AC power from the primary 217 of the power transformer 215. This circuit 231 includes a comparing means 233, which may be similar to that previously described connected to the bridge circuit 43 between the reference junction and the junction between the first and second resistors 47 and 49. The output of this comparing means 233 is applied through a resistor 235 to the base of the transistor 133 in the zero reset circuit 131. A high output on the output of the comparing means 233 causes the four-bit shift register 69 to reset to zero. The flip-flop 71 is reset to zero by connecting the collector of the transistor 133 through a resistor 237 and a diode 239 to the junction between the series resistors 85 and 87 in the flip-flop 71.

The output of the comparing means 233 is also connected through an amplifier 241 to one input of an AND gate 243, the other input of which is the power input to the load 7 rectified and limited. The AND gate 243 includes an NPN transistor 245 whose emitter is grounded, whose base serves as the one input of the AND gate 243, and whose collector is connected through a resistor 247 to the other input of the AND gate. The power input to the load 7 is rectified by connecting the variable terminal of the load 7 to a primary winding 247 of a transformer 249, the secondary winding 251 of which is connected through a diode 253 and a filter circuit 255 to the input of the AND gate 243. The voltage at the output of the filter circuit 255 is limited by a Zener diode 257.

The collector of the NPN transistor 245 is connected to the gate of a silicon controlled rectifier 259, the cathode of which is grounded. The anode of the silicon controlled rectifier 259 is connected through a resistor 261 to a positive voltage terminal 263. Thus, if an overheating condition is sensed and the power is applied to the load 7, the transistor 245 will conduct thereby causing the silicon controlled rectifier 259 to fire. This firing of the silicon controlled rectifier 259 causes a switch 265, which may be of the transistor type, to conduct thereby energizing a coil 267 of a relay in series with the switch 265. The contact 269 of the relay is a normally closed contact disposed in series with the primary winding 213 of the power transformer 215.

If desired, an override circuit (not shown) may be added to the controller. Such a circuit would be connected so as to connect full power to the load when a manual switch is closed. In this connection, a relay contact (not shown) may be connected so as to apply full power to the variable power lead of the load 7. In addition, if desired, a circuit (not shown) may be provided to energize a light (not shown) when the bridge 43 senses a temperature below the set point. Also, a light (not shown) may be provided to indicate the overheat condition.

From the above, it can be seen a temperature controller is provided which is relatively simple, accurate and reliable. The steady state error associated with controllers of the proportional type is eliminated in the above-described controller. The response of the control system can be closely matched to the thermal response characteristics of the load to thereby give very close control of the temperature of the load. Also, the controller controls the temperature of the load at exactly the same temperature for all power requirements and thermal loads. There is only one linear amplifier associated with the control point thereby greatly enhancing the reliability of the unit. Zero switching techniques are used in the output circuit to reduce the radio frequency interference filter requirements to a minimum. Also, the response of the controller can be slowed down to permit initial warmup of the load. The digitalizing of all circuits, except those for amplifying sensor resistance, eliminates any temperature compensation problems, which means simplification of the alignments and testing of the unit.

Various changes and modifications may be made in the above-described temperature controller without deviating or departing from the spirit or scope of the present invention.

Various features of the invention are set forth in the accompanying claims.

I claim:

1. A temperature control system comprising first means responsive to a temperature for providing a signal representing said temperature, second means responsive to said signal and providing a first type of signal when said temperature is above a predetermined temperature and a second type signal when said temperature is below said predetermined temperature, a clock pulse source, third means coupled to said clock pulse source and to said second means for energizing a plurality of its output leads in sequence in response to said clock pulses, the sequence being in one direction in response to said first type of signal and being in the opposite direction in response to said second type of signal, electrical heating means, a plurality of power leads for providing power in steps to said heating means and a plurality of switching means each connecting one of said power leads to said heating means and being responsive to the energization of one of said output leads.

2. A temperature control system in accordance with claim 1 in which said third means is a shift register.

3. A temperature control system in accordance with claim 1 in which said power leads extend from taps on a transformer.

4. A temperature control system in accordance with claim 1 in which said switching means is a silicon controlled rectifier having its anode-cathode circuit connected in series with said power leads and which further includes a zero switching means responsive to the alternating current of said power wave and providing a signal at the zero crossings of said power wave and fourth means connecting said output of said zero sync means to the SCR firing circuit to cause the SCR's to fire only at the zero crossing points.